United States Patent [19]

Nattel

[11] 4,316,999
[45] Feb. 23, 1982

[54] ELECTRICAL WIRING BOX AND CABLE CLAMP

[75] Inventor: William Nattel, Montreal, Canada

[73] Assignee: GTE Sylvania Canada Limited, Montreal, Canada

[21] Appl. No.: 171,925

[22] Filed: Jul. 23, 1980

[51] Int. Cl.³ .............................................. H02G 3/08
[52] U.S. Cl. ................................. 174/65 R; 220/3.2; 339/103 R
[58] Field of Search ..................................... 174/65 R; 220/3.2–3.94; 339/103 R, 103 B, 103 C

[56] References Cited

U.S. PATENT DOCUMENTS 3,526,703 9/1970 Tucker ............................. 220/3.2 X

FOREIGN PATENT DOCUMENTS

| 577589 | 6/1959 | Canada | 174/65 R |
|---|---|---|---|
| 658727 | 3/1963 | Canada | 174/65 R |
| 658728 | 3/1963 | Canada | 174/65 R |
| 1106304 | 3/1968 | United Kingdom | 174/65 R |

Primary Examiner—B. A. Reynolds
Assistant Examiner—D. A. Tone
Attorney, Agent, or Firm—Jerry F. Janssen

[57] ABSTRACT

Electrical wiring box arrangements comprise a wiring box with end, side, and rear walls and a cable clamp. The wiring box wall structure is provided with knock-out regions, a first cable-engaging means, and means for attaching the cable clamp to a wall having knock-out regions.

The cable clamp comprises a flexible flat sheet, attachable at one end to the box wall structure interior to the box. The opposite end of the cable clamp is provided with a foot portion, formed at an acute dihedral angle with the main body of the clamp.

A non-metallic sheathed electrical cable inserted through a knock-out opening in the box wall structure, deflects the unattached end of the clamp inwardly into the box, engaging the cable against removal from the knock-out opening in an outward direction by the action of the first cable-engaging means and the heel of the clamp foot portion bearing oppositely against the cable sheath.

18 Claims, 7 Drawing Figures

ELECTRICAL WIRING BOX AND CABLE CLAMP

BACKGROUND OF THE INVENTION

This invention relates to electrical wiring boxes. More particularly, it is concerned with electrical wiring box arrangements having integral cable clamps.

Many known types of electrical wiring box and cable clamp arrangements are of a type wherein the cable clamp and wiring box are separate and must be assembled, either at the time the box is manufactured, or later when the box is wired. One such type of box and clamp, of the type disclosed in U.S. Pat. No. 3,424,856, for example, requires that the cable be inserted in the clamp before the clamp is installed in a knock-out opening of the wiring box. The cable is clamped simultaneously with the installation of the clamp device in the knock-out aperture. Wiring box and clamp arrangements of this type do not allow for removal or repositioning of the cable in the clamp without removal of the clamp from the knock-out opening.

Yoke type cable clamps of the type disclosed in U.S. Pat. No. 2,973,212 clamp the cable between a wall of the box and a cable gripping yoke driven against the cable by means of a screw or bolt. This type of clamp involves additional cost of manufacture, owing to the need for threaded openings in the box wall, and to its several parts. Moreover, the installation of a cable in boxes fitted with such clamp devices in the field requires the time consuming step of tightening the clamp holding screw or bolt.

Cable clamp devices which make use of spring-loaded cable gripping elements have been disclosed. U.S. Pat. No. 2,556,977, for example, discloses one such clamp device which comprises a right angle mounting element and spring loaded foot. The cable is gripped between one leg of the right angle element and the spring foot. The short length of the spring loaded cable gripping foot in such clamps restricts them for use with a limited range of cable diameters.

It is therefore an object of this invention to provide improved wiring box and cable clamp arrangements which overcome the aforementioned disadvantages.

It is a further object of this invention to provide a cable clamp device which is integral with an electrical wiring box, thus saving manufacturing cost and field installation time.

It is a still further object of this invention to provide an electrical wiring box and cable clamp arrangement which is capable of use with wiring cables of a variety of sizes.

Another object of this invention is to provide a cable clamp and electrical wiring box arrangement which allows for ease of installation and clamping of an electrical cable while permitting simple repositioning or removal of the cable if required.

SUMMARY OF THE INVENTION

Electrical wiring box arrangements in accordance with this invention comprise an electrical wiring box including a wall structure defining front-to-rear walls and a rear wall therebetween which define a chamber within the box. The wall structure of the box is further provide with one or more knock-out regions for providing knock-out openings for receiving non-metallic sheathed electrical cable, and attachment means for mounting a cable clamping means to the wall structure interior to the box and adjacent to a knock-out region.

The wall structure also includes a first cable engaging means which, in a preferred embodiment, is a protrusion in the wall structure which engages the sheath of an electrical cable passing through a knock-out opening in the wall structure.

Electrical wiring box arrangements in accordance with this invention further include cable clamp means for clamping a non-metallic sheathed electrical cable passing through a knock-out opening in the wall structure.

The clamp means comprises a substantially flat, flexible and resilient main body portion with first and second end portions, and first and second flat surfaces.

Attachment receiving means in the first end portion of the main body of the clamp coact with the attachment means of the wall structure to attach the clamp to the box wall structure. A cable retaining means is contiguous with the second end portion of the main body of the clamp, providing a second cable engaging means.

In a preferred embodiment, the cable retaining means comprises a foot formed at an acute dihedral angle with the main body of the clamp. The heel edge of the foot portion contacts and engages a cable passing through a knock-out opening of a box having the clamp attached.

An electrical cable passing through a knock-out opening of a wiring box having a cable clamp of this invention attached to a wall thereof, deflects the second free end of the clamp inwardly into the box. The cable is secured against removal from the knock-out opening in an outward direction by the action of the first cable engaging means and the heel edge of the clamp bearing oppositely against the cable and locking it in place.

For a better understanding of the present invention, together with other and further objects, advantages and capabilities thereof, reference is made to the following disclosure and appended claims in connection with the above-described drawings.

DESCRIPTION OF THE PREFERRED EMBODIMENTS

Figure 1:
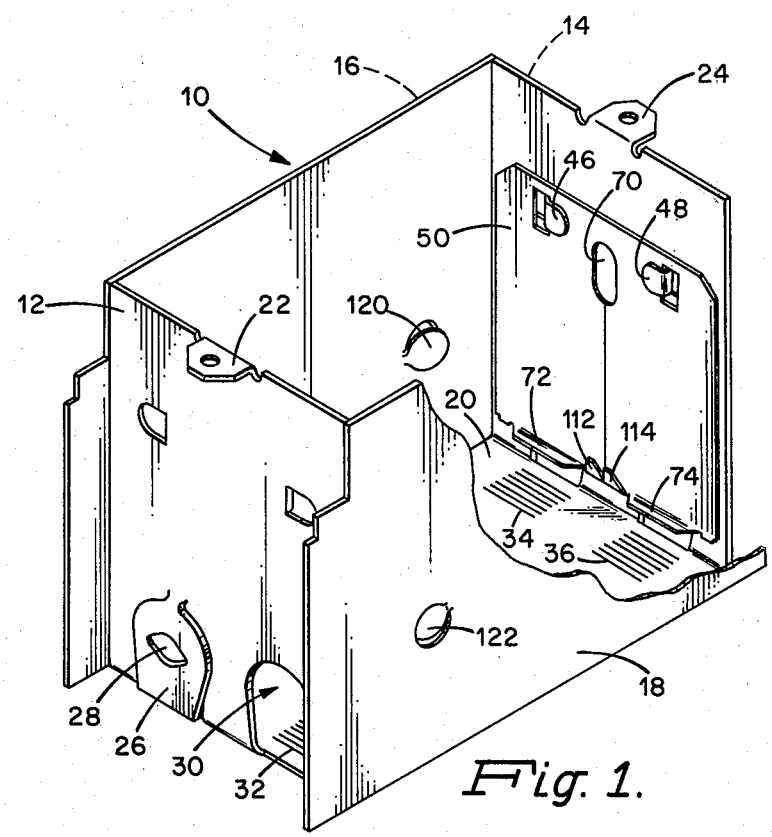
FIG. 1 is a partially cut-away perspective view of a wiring box arrangement in accordance with the present invention.

Referring to the drawing figures, an electrical wiring box arrangement in accordance with one embodiment of the present invention is shown in FIG. 1. An electrical wiring box 10 is comprised of a front-to-rear wall structure including end walls 12 and 14, side walls 16 and 18, and rear wall 20 which define a chamber within the box for receiving an electrical wiring device such as a switch or plug receptacle (not shown). Ears 22 and 24, integral respectively with end walls 12 and 14 are provided with threaded openings for mounting an electrical wiring device in the box chamber.

The wall structure of the wiring box 10 is provided with knock-out regions, typified by region 26 formed in end wall 12. Each knock-out region 26 is provided with a tool-receiving aperture 28 for prying the knock-out region from the wall structure to form a knock-out opening such as 30, shown in FIG. 1 with the knock-out region removed.

The knock-out regions may form a portion of the front-to-rear wall structure, or of the rear wall structure of the wiring box 10. But in any configuration of the knock-out regions it is preferred that the knock-out regions be located immediately adjacent to the intersection of one wall and another. This preferred orientation is shown in FIG. 1 by way of example where knock-out region 26 is located in end wall 12 immediately adjacent the intersection of end wall 12 and rear wall 20. Removal of a knock-out region situated immediately adjacent the intersection of two walls provides a knock-out opening such as 30 which permits an electrical wiring cable to pass through one wall and lie directly along the intersecting wall.

The wall structure of wiring box 10 is further provided with one or more protrusions or ridges for gripping or engaging a non-metallic sheathed cable. In a preferred embodiment shown in FIG. 1, the cable engaging protrusion is a series of substantially parallel ridges or scored lines 32, 34, or 36 embossed in rear wall 20. The protrusion is preferably located in a wall which intersects a wall having one or more knock-out regions and in proximity to the knock-out region. For example, protrusion 32 is formed in rear wall 20 proximal to knock-out opening 30 in end wall 12.

Figure 6:
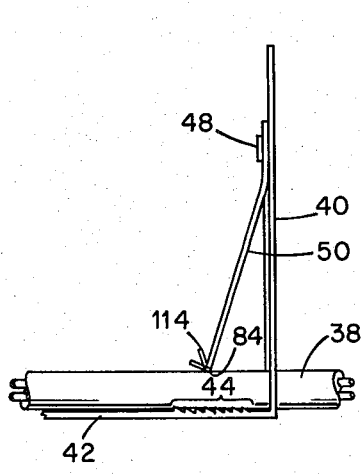
FIG. 6 is a side view of a fragment of an electrical cable and wiring box arrangement of the present invention.

As seen best in FIG. 6, this relative orientation of a knock-out opening and wall protrusion allows a non-metallic sheathed electrical cable 38 to pass through a knock-out opening in one wall 40 and to lie along a second wall 42 with the cable 38 contacting the protrusion 44 in the second wall 42.

Figure 3:
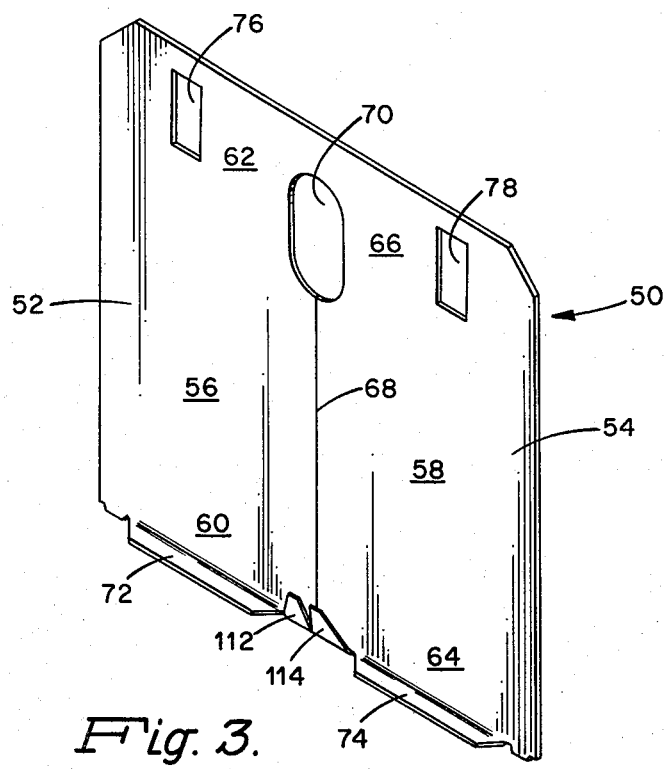
FIG. 3 is a perspective view of an electrical cable clamp in accordance with the present invention.

An electrical wiring box arrangement in accordance with this invention further includes a cable clamp device. A preferred embodiment of the cable clamp device 50 is shown in FIG. 3. The clamp is formed of a sheet of substantially flat flexible and resilient material such as metal or plastic, preferably thin gage steel.

The cable clamp 50 is preferably bifurcated into two leg portions 52 and 54 although cable clamps having single or multiple leg portions are contemplated as falling within the scope of this invention.

Each leg portion, as for example leg portion 52 comprises a substantially flat main body portion 56 with end portions 60 and 62. Each leg portion 52 and 54 is joined laterally to the other at their respective end portions 62 and 66. Slit 68 which bifurcates or divides cable clamp 50 permits each leg portion 52 or 54 to flex independently of the other. Slit 68 ends in a strain relieving aperture 70 which minimizes shearing stresses in cable clamp 50 when one leg portion is flexed independently of the other.

A cable retaining portion of each leg portion is contiguous with the end portion of each leg. For example, foot portion 72, contiguous with end portion 60 of leg 52, provides for retaining non-metallic sheathed electrical cable. As can better be seen in the lateral view of cable clamp 50 in FIG. 4, the first surface 80 of foot portion 74 forms an acute dihedral angle α with the first surface 82 of the main body portion of cable clamp 50. It has been found that optimal cable clamping action occurs when α is between 75° and 90°, preferably about 80°. The heel 84 formed at the vertex of the dihedral angle formed by the second surface 86 of foot portion 74 where it intersects the second surface 88 of the main body portion of the cable clamp 50 provides a cable engaging edge for clamping or securing a cable sheath when the clamp is in use.

Figure 5:
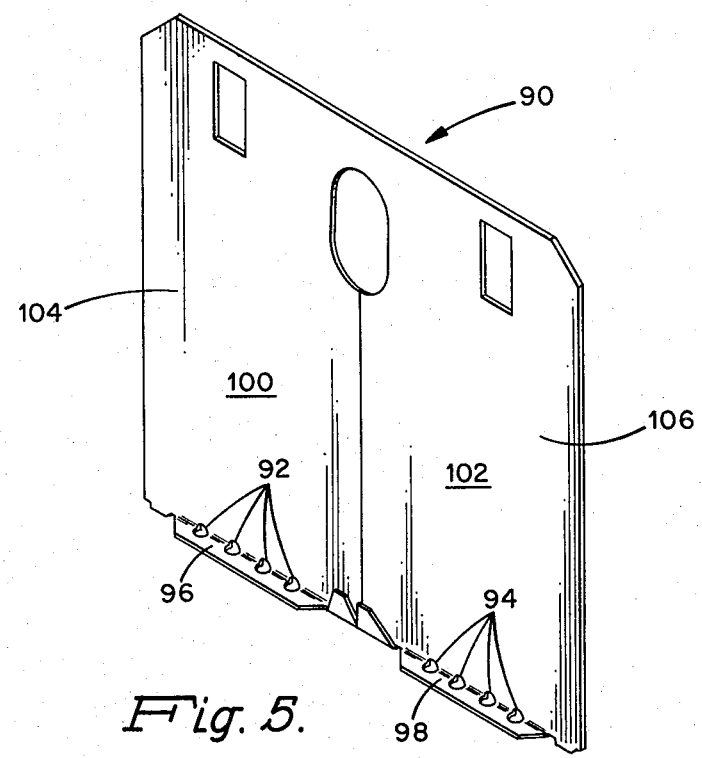
FIG. 5 is a perspective view of an electrical cable clamp in accordance with an alternative embodiment of the present invention.

An alternative embodiment of the cable clamp device of this invention is shown in FIG. 5. In the embodiment shown there clamp 90 is provided with serrations 92 and 94 at the vertex of the dihedral angles formed, for example, by foot portions 96 and 98 meeting main body portions 100 and 102 of legs 104 and 106, respectively. The serrations provide addition cable gripping or engaging capability and may conveniently be formed by making a series of holes in the body of the clamp prior to folding the clamp material to produce the foot portion.

Cable clamp 50 is attached to the wall structure of wiring box 10 adjacent to a knock-out region as can best be seen in FIG. 1. As shown there, the end walls are provided with attachment tabs or ears such as tabs 46 and 48 in end wall 14. Although tabs or ears formed in the wall structure are the preferred means for attaching cable clamps in accordance with this invention because of their ease and low cost of fabrication, other fasteners such as screws, bolts, or rivets passing through apertures in the wall structure may also be used.

Figure 2:
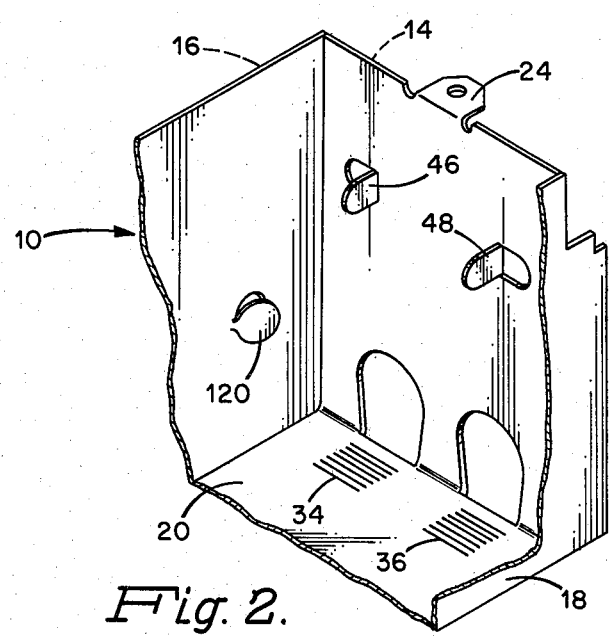
FIG. 2 is a perspective view of a fragment of a wiring box in accordance with the present invention prior to the installation of a cable clamp in the box.

A detail of the attachment tabs or ears, prior to attachment of a cable clamp is shown in the partial cutaway view of wiring box 10 shown in FIG. 2. Tabs or ears 46 and 48 are formed from end wall 14 and protrude or extend inwardly into the interior chamber of box 10. Tabs 46 and 48 are formed in the same wall as that having knock-out regions and, prior to attachment of a cable clamp, are essentially perpendicular to the wall structure.

Referring again to FIG. 3, slotted apertures 76 and 78 in end portions 62 and 66 of cable clamp 50 are spaced apart to receive tabs 46 and 48. The clamp 50 is shown in FIG. 1 attached to end wall 14 where tabs 46 and 48 are shown bent over or crimped to secure end portions 62 and 66 of clamp 50 to wall 14. Cable clamp 50 is attached to a wall which is also provided with knock-out regions. The relative positions of the clamp and knock-out regions is preferably such that the foot portion of the cable clamp is spaced apart from the adjacent wall bearing the cable engaging protrusion. The spacing is preferably slightly less than the diameter of the cable to be clamped in the knock-out aperture. For example, in FIG. 1, cable clamp 50 is shown attached to end wall 14 in such a position that foot 72 is spaced slightly apart from rear wall 20 which bears cable engaging protrusion 34.

This relative configuration of the cable engaging wall protrusion and the cable engaging foot portion of the cable clamp permits a non-metallic sheathed cable to be clamped in a knock-out opening as shown in FIG. 6. An electrical cable 38 is inserted through wall 40, flexing or deflecting the free end of cable clamp 50 inwardly into the box chamber, with the cable lying along wall 42 and contacting or engaging protrusion 44. The resiliency of cable clamp 50 causes the heel 84 of the clamp 50 to bear against the cable, in turn forcing the cable against protrusion 44. Any attempts to pull the cable from the knock-out in an outward direction only increases the forces of the clamp and protrusion bearing oppositely against the cable.

Figure 7:
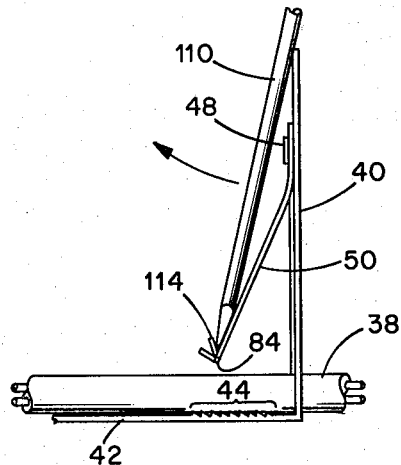
FIG. 7 is a side view of a fragment of an electrical cable and wiring box arrangement of the present invention.

However, a clamped cable is easily removed from, or repositioned in, a knock-out opening by prying the free end of the cable clamp away from the cable as shown in FIG. 7. The bit of a screwdriver, 110 or like tool is inserted in tool-receiving tab 114 prying the heel 84 of the clamp 50 away from the cable in the direction of the arrow.

Figure 4:
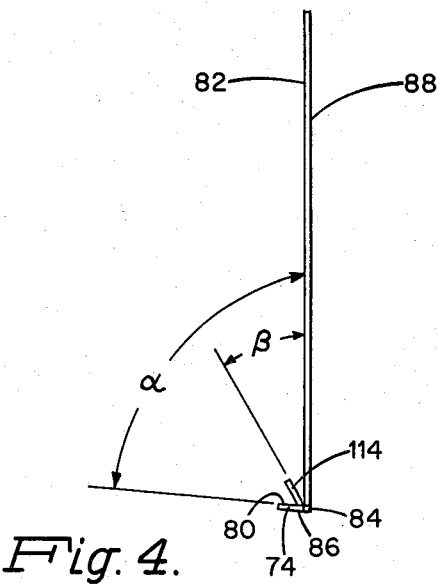
FIG. 4 is a side view of the electrical cable clamp of FIG. 3.

The preferred configuration of the tool-receiving tab is shown in FIGS. 3 and 4. The tab 114 is formed of a portion of foot 74 forming a more acute angle $\beta$ with the main body portion than does the foot portion itself.

To prevent excessive flexure or deflection of a cable clamp leg portion into the box chamber, wiring box arrangements in accordance with this invention are provided with tabs to restrain the cable clamp. For example, in a rectangular wiring box having mutually orthogonal or perpendicular end, side, and rear walls, the restraining tabs are preferably located in a wall orthogonal to the wall having the attached cable clamp and the wall having the cable engaging protrusion. Thus, as shown in FIG. 1, restraining tab 120 is located in side wall 16, proximate to the main body portion of cable clamp 50 attached to end wall 14; cable engaging protrusion 34 is located in rear wall 20. Excessive bending of a cable clamp leg portion into the box chamber causes the main body portion of the clamp to contact the restraining tab, preventing further inward flexure of the clamp leg.

While there have been shown and described what are at present believed to be the preferred embodiments of the invention, it will be obvious to those skilled in the art that various changes and modifications may be made therein without departing from the scope of the invention as defined by the appended claims.

What is claimed is:

1. An electrical wiring box arrangement comprising: an electrical wiring box including:
   a wall structure defining front-to-rear walls and a rear wall therebetween which in combination define a chamber within the box;
   said wall structure having a knock-out region for providing a knock-out opening for receiving non metallic sheathed cable, first attachment means for mounting cable clamp means interior to said box adjacent to said knock-out region, and first cable engaging means; and
   a cable clamp means for clamping non-metallic sheathed cable including:
   a substantially flat flexible and resilient main body portion having opposite first and second end portions, and first and second flat surfaces; second attachment means in said first end portion for coacting with said first attachment means of said electrical wiring box to attach said cable clamp means to said wall structure; and
   cable retaining means comprising a foot portion contiguous with said second end portion of said cable clamp means, said foot portion having first and second surfaces; said first surface of said foot portion subtending a dihedral angle from about 75° to about 90° with said first surface of said main body portion; a heel edge being formed at the vertex of the dihedral angle at the intersection of said second surface of said foot portion and said second surface of said main body portion providing second cable engaging means;
   whereby a cable passing through a knock-out opening of an electrical wiring box having said cable clamp means attached to the wall structure thereof, deflects said second end of said cable clamp means inwardly into said chamber securing said cable against removal from said knock-out opening in an outward direction by the action of said first and said second cable engaging means bearing oppositely against said cable.

2. An electrical wiring box arrangement in accordance with claim 1 wherein said heel edge providing said second cable engaging means is serrated.

3. An electrical wiring box arrangement in accordance with claim 1 wherein said wall structure comprises a front-to-rear wall forming an angle with a rear wall, and a knock-out region in a portion of one of said walls immediately adjacent the intersection of said front-to-rear wall and said rear wall, whereby a cable passing through a knock-out opening provided by said knock-out region in one of said walls lies along the other of said walls.

4. An electrical wiring box arrangement in accordance with claim 3 further having a cable engaging protrusion in a portion of said wall being at an angle with said wall having said knock-out region.

5. An electrical wiring box arrangement in accordance with claim 4 wherein said protrusion comprises a plurality of substantially parallel ridges in said wall.

6. An electrical wiring box arrangement in accordance with claim 1 wherein said first attachment means comprises a tab protruding from said wall structure inwardly into said box chamber.

7. An electrical wiring box arrangement in accordance with claim 6 wherein said second attachment means comprises a slotted aperture in said cable clamp means for receiving said tab.

8. An electrical wiring box arrangement in accordance with claim 1 wherein said cable clamp means further includes a tool-receiving means contiguous with said second end portion of said cable clamp means and adjacent said foot portion whereby said cable clamp means attached to said wall structure is deflectable by a tool inserted into said tool-receiving means to enable easy cable removal.

9. An electrical wiring box arrangement in accordance with claim 1 wherein said wall structure further includes cable clamp restraining means for preventing excessive deflection of said main body portion of said cable clamp means inwardly into said box chamber.

10. An electrical wiring box arrangement in accordance with claim 9 wherein said wall structure comprises mutually orthogonal first and second front-to-rear walls and back wall, said cable clamp restraining means comprising a protrusion on a portion of one of said walls orthogonal to the wall having said cable clamp means attached thereto, said protrusion being proximate said main body portion of said cable clamp means.

11. An electrical wiring box arrangement in accordance with claim 1 wherein said dihedral angle is about 80°.

12. An electrical wiring box arrangement comprising: an electrical wiring box including:

a wall structure defining front-to-rear walls and a rear wall therebetween which in combination define a chamber within the box;

said wall structure having pairs of adjacent knock-out regions for providing knock-out openings for receiving non-metallic sheathed cable, first attachment means for mounting cable clamp means interior to said box adjacent to said pairs of said knock-out regions, and first cable engaging means; and cable clamp means for clamping non-metallic sheathed cable including:

a substantially flat flexible and resilient member bifurcated to provide first and second leg members, each of said leg members having a main body portion and first and second end portions and first and second flat surfaces;

said first leg member laterally joined at said first end portion thereof to said second leg member at said first end portion thereof;

second attachment means in said joined first end portions for coacting with said first attachment means of said electrical box to attach said cable clamp means to said wall structure interior to said box adjacent to a pair of said knock-out regions;

cable retaining means comprising a foot portion of each of said leg members, said foot portion contiguous with said second end portion of each of said leg members, each of said foot portions having first and second surfaces; said first surface of said foot portion of each said leg member subtending a dihedral angle from about 75° to about 90° with the first surface of said main body portion of each said leg member; a heel edge being formed at the vertex of the dihedral angle at the intersection of said second surface of said foot portion of each said leg member and said second surface of said main body portion of said leg members providing second cable engaging means for each of said leg members;

whereby a cable passing through one of said pairs of adjacent knock-out openings of an electrical wiring box having said cable clamp means attached to the wall structure thereof, deflects inwardly into said chamber said second end portion of one of said leg members independently of the second of said leg members, securing said cable against removal from said knock-out opening in an outward direction by the action of said first and said second cable engaging means bearing oppositely against said cable.

13. An electrical wiring box arrangement in accordance with claim 12 wherein each of said heel edges providing said second cable engaging means is serrated.

14. An electrical wiring box arrangement in accordance with claim 12 wherein said wall structure comprises a front-to-rear wall forming an angle with a rear wall, and a pair of adjacent knock-out regions in a portion of one of said walls immediately adjacent the intersection of said front-to-rear wall and said rear wall, and a protrusion in a portion of the other of said walls, said protrusion providing said first cable engaging means; whereby a cable passing through a knock-out opening provided by one of said pair of knock-out regions in one of said walls lies along the other of said walls contacting said first cable engaging means.

15. An electrical wiring box arrangement in accordance with claim 12 wherein said first attachment means comprises a pair of spaced apart tabs protruding from said wall structure inwardly into said box chamber.

16. An electrical wiring box arrangement in accordance with claim 15 wherein said second attachment means comprises a pair of slotted apertures in said second end of said clamp means spaced apart to receive said tabs protruding from said wall structure.

17. An electrical wiring box arrangement in accordance with claim 12 further including a tool-receiving means comprising a portion of each of said end portions of each of said leg members, formed at a more acute angle with said main body portion of each of said leg members than the angle formed between said foot portion and said main body portion, whereby each of said leg members may be independently deflected inwardly into said box chamber by inserting a tool into said tool-receiving means when said clamp means is attached to said wall structure of said box.

18. An electrical wiring box arrangement in accordance with claim 12 wherein each of said dihedral angles is about 80°.

* * * * *